United States Patent [19]

Smith et al.

[11] 4,280,850

[45] Jul. 28, 1981

[54] Si3N4 HAVING HIGH TEMPERATURE STRENGTH AND METHOD

[75] Inventors: J. Thomas Smith, Acton; Carr L. W. Quackenbush, Lexington; F. Joseph Reid, Acton, all of Mass.

[73] Assignee: GTE Laboratories, Incorporated, Waltham, Mass.

[21] Appl. No.: 916,334

[22] Filed: Jun. 15, 1978

[51] Int. Cl.³ .................. C04B 35/50; C04B 35/58
[52] U.S. Cl. .................................. 106/73.2; 156/735
[58] Field of Search ............... 106/73.5, 73.2; 264/65; 423/344

[56] References Cited

U.S. PATENT DOCUMENTS

| | | | |
|---|---|---|---|
| 3,830,652 | 8/1974 | Gazza | 106/73.5 |
| 3,833,389 | 9/1974 | Komeya et al. | 106/55 |
| 4,025,351 | 5/1977 | Masaki | 106/73.5 |
| 4,039,340 | 8/1977 | Weaver | 106/55 |
| 4,046,580 | 9/1977 | Ishüet al. | 106/73.2 |
| 4,066,468 | 1/1978 | Kamigaito | 106/73.5 |
| 4,073,845 | 2/1978 | Buljan et al. | 106/73.2 |
| 4,102,698 | 7/1978 | Lange et al. | 106/73.5 |
| 4,113,830 | 9/1978 | Magdiyasni et al. | 106/73.5 |

FOREIGN PATENT DOCUMENTS

| | | | |
|---|---|---|---|
| 2258762 | 6/1974 | Fed. Rep. of Germany | 106/73.5 |
| 970639 | 9/1964 | United Kingdom | 423/344 |

OTHER PUBLICATIONS

Lange FF. et al "Phase Relations and Stability Studies in the $Si_3N_4$ —$SiO_2$ —$Y_2O_3$ Pseudoternary Sytem" JACS vol. 60 No. 5-6 May-Jun. 1977 pp. 249-252.

Tsuge et al. "Effect of Crystallizing the Brain Boundary Glass Phase . . . Hot Pressed $Si_3N_4$ Containing $Y_2O_3$ ", J. Am. Ceramic Soc. vol. 58 No. 7-8, pp. 323-326 (Jul., Aug. 1975).

Smith, J. T., "Temperature and Compositional Stability of a $Y_6Si_6O_2$, Phase in Oxidized $Si_3N_4$ ", J. Am. Ceramic Soc. Sep.-Oct. 1977 pp. 465-466.

Primary Examiner—O. R. Vertiz
Assistant Examiner—Mark Bell
Attorney, Agent, or Firm—John C. Fox

[57] ABSTRACT

Polycrystalline ceramic bodies of $Si_3N_4$ when prepared to obtain an intergranular phase which is substantially crystalline, exhibits significantly improved mechanical strength at elevated temperatures above 1,000° C. up to 1600° C. over bodies having glass-containing intergranular phases.

5 Claims, 10 Drawing Figures

Si3N4 HAVING HIGH TEMPERATURE STRENGTH AND METHOD

BACKGROUND OF THE INVENTION

1. Field of the Invention

This invention relates to polycrystalline ceramic bodies of $Si_3N_4$, and more particularly relates to such bodies having a substantially crystalline intergranular phase, and also relates to methods for preparing such bodies.

2. Prior Art $Si_3N_4$ powder characterized by cation impurities of 0.1 weight percent or less, a morphology of predominantly crystalline alpha phase and/or amorphous phase and fine particle size (3 microns or less average particle size as determined by B. E. T.), when consolidated with an additive such as MgO or $Y_2O_3$ and sintered, is known to enable production of polycrystalline bodies approaching theoretical density. See U.S. Pat. No. 4,073,845, issued to S. T. Buljan, et al. on Feb. 14, 1978, and assigned to GTE Sylvania Incorporated. Such powders may be consolidated into dense bodies by either hot pressing at less severe temperature and pressure conditions than are necessary with some less pure and less reactive powders (see U.S. Pat. No. 3,830,652 issued to G. E. Gazza) or by cold pressing and sintering, which is not possible with some less pure and less reactive powders. In the fabrication of such polycrystalline bodies, up to 25 weight percent of yttrium oxide or a lanthanide rare earth oxide such as $CeO_2$ is typically added as a sintering or densifying aid. While such modifying additives are thought to deleteriously affect maximum attainable high temperature strength and creep resistance, nevertheless such additives are thought essential to achieve highest densities, that is, densities approaching theoretical density, which are also critical to the achievement of high temperature strength.

Unfortunately, it has been found that certain dense $Si_3N_4$ bodies containing densifying additives, while exhibiting excellent mechanical strength at room temperature and elevated temperatures up to about 1,000° C., undergo significant and sometimes drastic reductions in strength at temperatures above 1,000° C. and particularly above 1200° C.

SUMMARY OF THE INVENTION

In accordance with the invention it has been discovered that dense polycrystalline bodies of a first phase of $Si_3N_4$ grains and a second intergranular phase of $Si_3N_4$, $SiO_2$, intentionally added densifying aids and unintentional impurities exhibit remarkable retention of mechanical strength at temperatures above 1000° C. up to 1600° C. when the intergranular phase is substantially completely crystalline. As used herein, the terms "crystalline" and "polycrystalline" describe a solid composed of atoms, ions or molecules arranged in a pattern which is repetitive in three dimensions and exhibits distinct x-ray diffraction intensity peaks characteristic of the crystal structure, while "glass", "glassy" or "amorphous" means a short range order solid as indicated by its lack of x-ray diffraction intensity peaks and by broad infrared absorption peaks.

In accordance with preferred embodiments of the invention to be described in detail herein, the crystallinity of the intergranular phase by the exclusion of amorphous or glassy material may be achieved either by controlling the composition during processing to insure the exclusion of glass stabilizing additives or impurities, or in the alternative by giving the body a post-sintering crystallization heat treatment.

Such methods enable production of polycrystalline bodies having improved mechanical strength at temperatures above 1000° C. up to 1600° C., making such bodies useful as structural parts or components in high operating temperature environments, for example, vehicular and aerospace engines and structures, regenerators for industrial waste heat recovery, etc.

DETAILED DESCRIPTION OF THE INVENTION

For a better understanding of the present invention, together with other and further objects, advantages and capabilities thereof, reference is made to the following disclosure and appended claims in connection with the above-described drawings.

The materials described herein have a composite microstructure of $Si_3N_4$ grains and an intergranular phase consisting of $SiO_2$ (a natural impurity on the surface of the $Si_3N_4$ starting powder) and the densifying additive. In addition, unintentional impurities present in the body tend to concentrate in the intergranular phase. Because the intergranular phase is continuous, its characteristics profoundly affect the high temperature properties of the composite material. An amorphous second phase is highly undesirable in that silicate glasses which tend to form between the grains lead to poor mechanical strength of the $Si_3N_4$ body above about 1200° C.

The presence of amorphous material between the $Si_3N_4$ grains facilitates their separation at high temperature. This separation is manifested by slow crack propagation leading to plastic deformation of the body and causing degradation of structural integrity.

Impurities in the starting raw material powders, or impurities introduced during processing prior to consolidation which are present in $Si_3N_4$ bodies such as oxides (such as $Al_2O_3$), which are soluble in the silicate second phase will stabilize this intergranular phase in its amorphous state by offering hindrance to the reorganization process which allows crystallization. It is therefore desirable for these powders to be processed into polycrystalline bodies in such a way that the intergranular phase undergoes full crystallization during cooling from the sintering temperature or alternatively that this full crystallization be obtained by a subsequent heat treatment procedure. By either course, a considerably more refractory intergranular phase is obtained which in turn leads to significantly enhanced high temperature mechanical strength and a large reduction or elimination of the plastic deformation observed in the presence of glassy phases.

While the invention applies to bodies containing any densifying additives, (known additives including for example, MgO, CrN, $ZrO_2$, ZrN, $Y_2O_3$, $La_2O_3$ and $CeO_2$), it is preferred to employ a densifying additive of the type $RE_2O_3$ where RE is yttrium or a lanthanide rare earth including La, Ce, Pr, Nd, Pm, Sm, Eu, Gd, Tb, Dy, Ho, Er, Tm, Yb, and Lu. While some of these rare earth oxides may not be in the form of $RE_2O_3$ as starting materials, for example, $CeO_2$, and $PrO_2$, they are subsequently converted to the $RE_2O_3$ form in the final dense polycrystalline body.

To prepare powder compositions for consolidation, $Si_3N_4$ powders are typically mixed with a densification aid by ball milling. The milling may be done wet and/or dry. There is a natural contamination of the powder mixture by abrasion of the milling container and milling media surfaces during milling. In order to substantially reduce or avoid such contamination, milling should be carried out in non-abradable or non-contaminating containers such as linear polyethylene, polyurethane or rubber lined containers using $Si_3N_4$ milling media. Chemical analysis of powders milled both wet and dry with $Al_2O_3$ media shows a total of 1 to 3 weight percent $Al_2O_3$ added to the batch with about ½ of that amount picked up during wet milling and the remainder half during dry milling. This amount has been reduced by incorporation of non-contaminating $Si_3N_4$ media into the milling procedure and/or by shortening milling time. Using $Si_3N_4$ media for wet milling and $Al_2O_3$ media for dry milling reduces the $Al_2O_3$ content to about 0.5 to 1.5 weight percent. Milling both wet and dry with $Si_3N_4$ media reduces the $Al_2O_3$ content essentially to zero, that is, to the level present as an impurity in the $Si_3N_4$ powder.

The milled powder is usually screened through a coarse mesh screen, eg., 50 or 100 mesh, prior to consolidation.

Bodies may be prepared by hot pressing, hot isotatic pressing, or by any pressureless sintering step preceded by a suitable consolidation step such as dry pressing, isostatic pressing, extruding, slip casting, injection molding, etc. See U.S. Pat. No. 4,073,845 for a general procedure for pressureless sintering of $Si_3N_4$ bodies. The screened powder is then loaded into a graphite hot pressing die whose interior surfaces have previously been coated with boron nitride powder. The powder is then prepressed at about 2000 psi and then the die is placed in a chamber containing argon and a pressure of about 500 psi is applied up to about 1200° C. and then pressure and temperature are increased simultaneously so that the ultimate pressure and temperature are achieved at about the same time. The densification process is monitored using a dial guage indicating ram travel with the die body. A rate of downward movement of the ram cross head below about 0.004 inches per hour indicates completion of densification. The assembly is then cooled over a period of about 1 to 2 hours. Ultimate pressures and temperatures of from about 3,000 to 5,000 psi and 1675° C. to 1800° C. for a time of about 2 to 5 hours are adequate conditions for the achievement of essentially full densification of the silicon nitride body. The strength of compositions hot pressed to theoretical density from $Si_3N_4$-$Y_2O_3$ and $Si_3N_4$-$CeO_2$ powders with a range of $Al_2O_3$ contents are given in Tables I and II.

All strength measurements are in terms of modulus of rupture (MOR) ($10^3$ psi), and were made from room temperature to 1400° C. using a four point loading fixture with a 0.9" outer span and a 0.4" inner span, which stresses the specimen by cross bending. Specimen size was 0.050" by 0.100" by one inch. All hot pressed specimens were tested in the strong direction with a cross head speed of 0.02" per minute on an Instron machine. Strength was determined by the elastic beam formula, the dimensions of the test specimen and the test fixture. Theoretical density was calculated by the simple rule of mixtures for $Si_3N_4$ and $RE_2O_3$. As may be seen from these Tables, strength increases dramatically at 1400° C. with decreasing $Al_2O_3$ impurity content.

TABLE I

Strength of Hot Pressed $Si_3N_4$ + 13 Weight Percent $Y_2O_3$

| Sample No. | $Al_2O_3$ (weight percent) | MOR (psi × $10^3$) | | | |
|---|---|---|---|---|---|
| | | Room Temperature | 1000° C. | 1200° C. | 1400° C. |
| 1 | 0 | 122.9 | 112.7 | 88.8 | 93.8 |
| 2 | 0.5 | 128.8 | — | 93.7 | 47.5 |
| 3 | 2.44 | 133.8 | 110.1 | 85.6 | 30.7 |

TABLE II

Strength of Hot Pressed $Si_3N_4$—$CeO_2$

| | | MOR (psi × $10^3$) | | | |
|---|---|---|---|---|---|
| | | 1.5 $Al_2O_3$ (weight percent) | | No $Al_2O_3$ | |
| Sample No. | $CeO_2$ (weight percent) | Room Temperature | 1400° C. | Room Temperature | 1400° C. |
| 1 | 4 | 104.5 | 27.7 | 96.6 | 43.4 |
| 2 | 8 | 107.5 | 23.9 | 103.8 | 39.1 |
| 3 | 12 | 102.9 | 17.8 | 134.3 | 75.7 |

The data presented in Tables I and II was obtained for bodies fabricated from high purity $Si_3N_4$ powder, that is, powder containing less than about 0.1 weight percent cation impurities. Tables III and IV show the effect of impurity content in the starting powder material on final high temperature strength. As may be seen from the Tables, when both powders are milled with $Si_3N_4$ media and in linear polyethylene containers so that no alumina is introduced during milling, high temperature strength is up to 60 percent greater for the high purity powder than for the low purity powder. Both samples were hot pressed at 1750° C. and 5000 psi to 100 percent of theoretical density.

TABLE III

Impurity Content of Starting $Si_3N_4$ Powder (percent by weight)

| Impurity Cation | High Purity Powder | Low Purity Powder |
|---|---|---|
| Al | 0.002 | 0.423 |
| Fe | — | 1.15 |
| Mn | — | 0.027 |
| C | — | 0.458 |
| Mg | 0.0007 | 0.013 |
| Ca | 0.0006 | 0.224 |
| Mo | 0.01 | — |

TABLE IV

Strength of Hot Pressed Si₃N₄ + 13 Weight Percent Y₂O₃ Compositions

| $Si_3N_4$ Starting Powder | MOR (psi × 10³) | | | |
|---|---|---|---|---|
| | Room Temperature | 1000° C. | 1200° C. | 1400° C. |
| High purity powder | 122.9 | 112.7 | 88.8 | 93.8 |
| Low purity powder | 98.9 | 88.3 | 65.7 | 57.9 |

Figure 1:
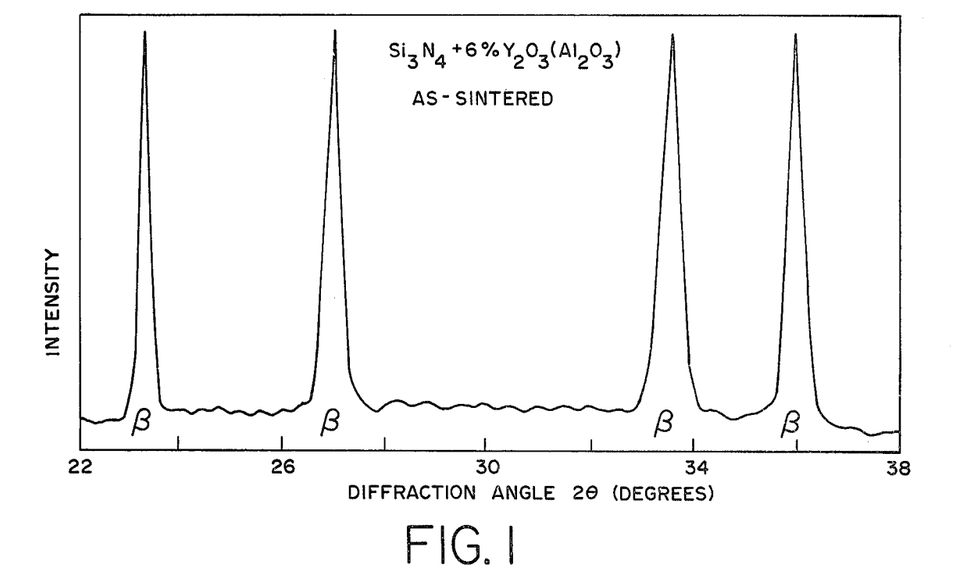
FIG. 1 is a portion of an x-ray diffraction pattern for a silicon nitride body containing six percent $Y_2O_3$ plus about 2.5 percent $Al_2O_3$.
Figure 2:
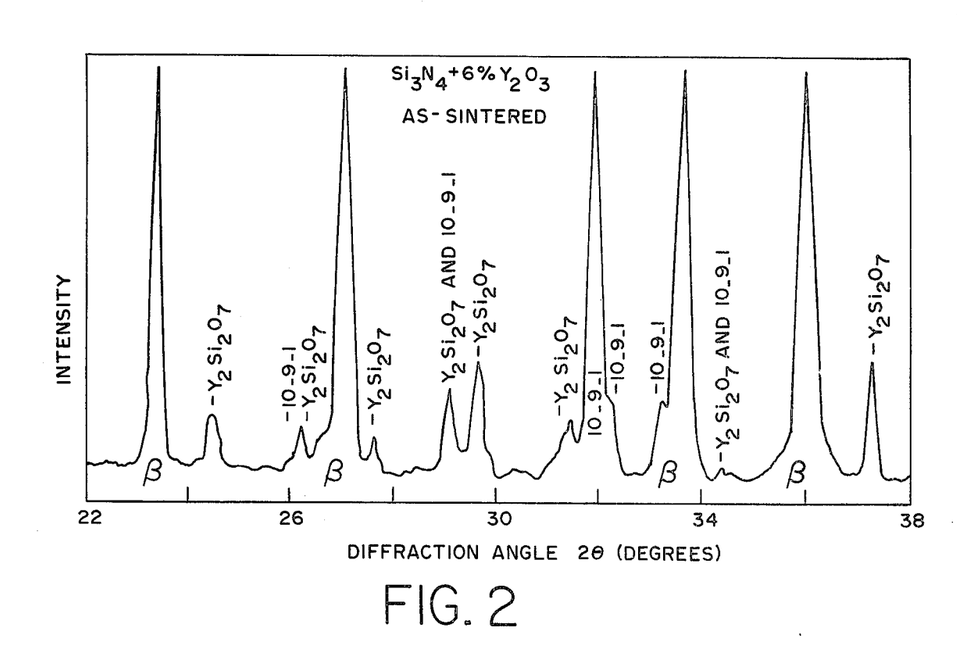
FIG. 2 is a portion of an x-ray diffraction pattern for the silicon nitride body of FIG. 1 essentially without $Al_2O_3$.
Figure 3A:
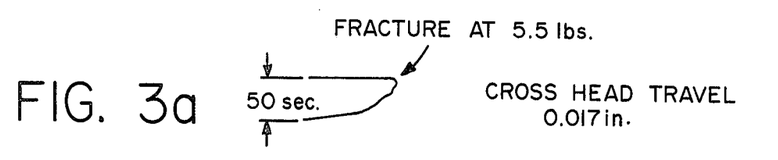
FIGS. 3a, 3b, 4a and 4b are load deformation curves for $Si_3N_4$ bodies containing 12 percent $Y_2O_3$ plus up to 2 weight percent $Al_2O_3$ before and after a post-sintering crystallization heat treatment.
Figure 3B:
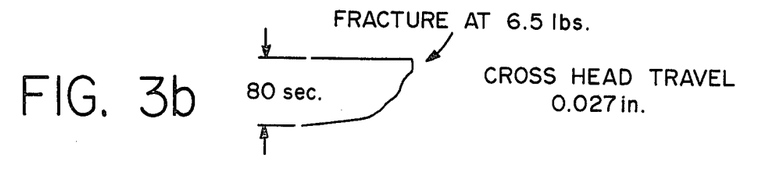
Figure 4A:
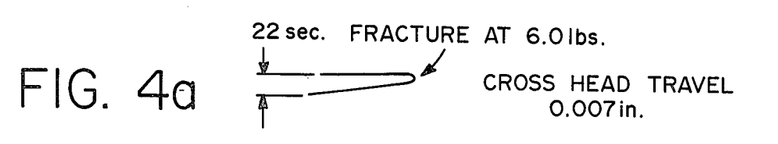
Figure 4B:
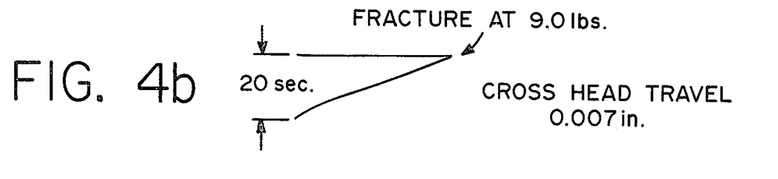

The previous examples are for sintering by hot pressing $Si_3N_4$ bodies. Pressureless sintering in a nitrogen atmosphere was also used to prepare $Si_3N_4$ bodies with varying $Al_2O_3$ content. An $Si_3N_4$ body with 6 weight percent $Y_2O_3$ and essentially no $Al_2O_3$ was sintered two hours at 1775° C. and two hours at 1975° C. resulting in about 98 percent of theoretical density. This sample was subjected to x-ray diffraction analysis using a scanning x-ray diffractometer with copper $K_a$ radiation. Diffraction analysis showed three phases present, beta $Si_3N_4$, $Y_2Si_2O_7$ and $10Y_2O_3.9SiO_2.1Si_3N_4$. Previous diffraction analysis of an $Si_3N_4$ body containing six weight percent $Y_2O_3$ and about 2.5 weight percent $Al_2O_3$ showed only beta $Si_3N_4$ to be present, indicating that the second phase was x-ray amorphous. The key portions of the diffractometer scans are shown in FIGS. 1 and 2 for the alumina-containing and alumina-free bodies respectively, indicating that $Al_2O_3$ causes the second phase to be x-ray amorphous in pressureless sintered $Si_3N_4$ bodies.

Figure 8:
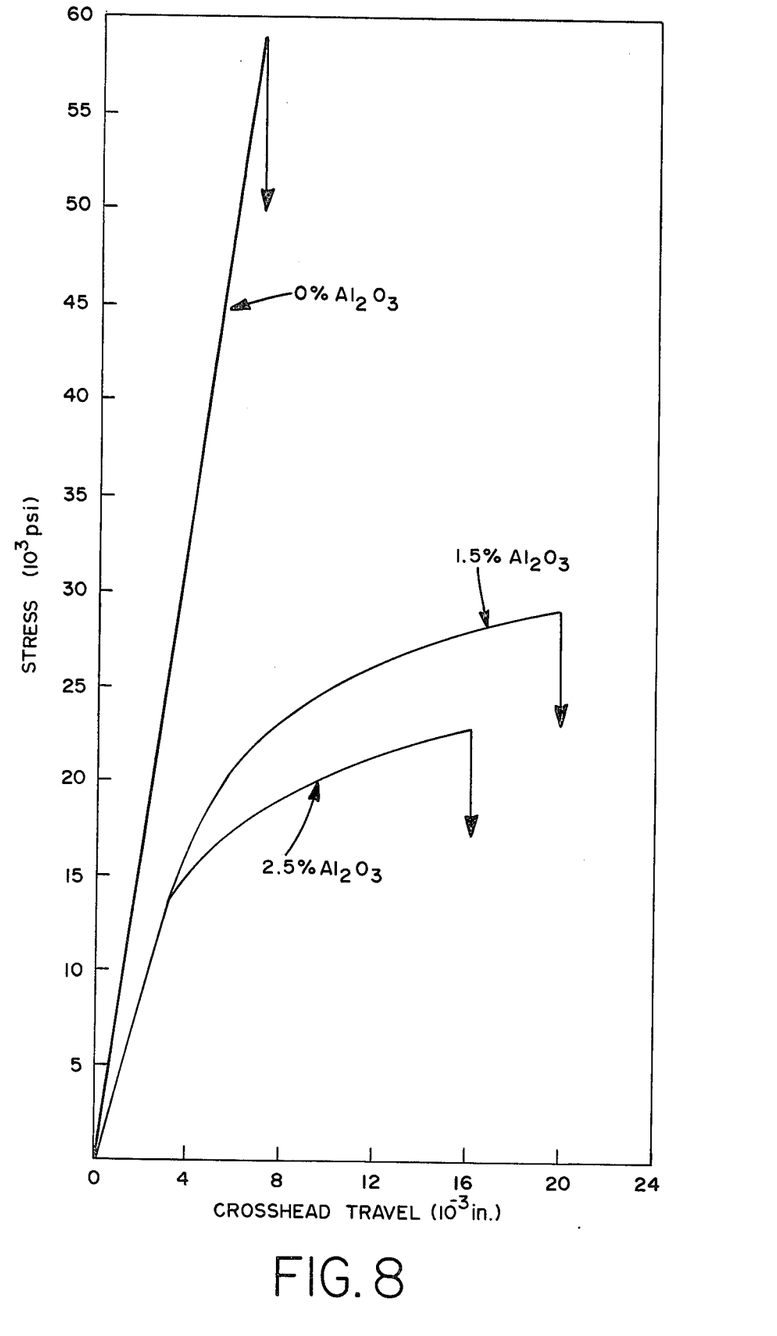
FIG. 8 is a plot of mechanical stresses at 1400° C. versus cross head travel for $Si_3N_4$ bodies containing 6 percent $Y_2O_3$ and 0 to 2.5 percent $Al_2O_3$.

The effect of varying $Al_2O_3$ levels upon high temperature strength of pressureless sintered bodies of $Si_3N_4$ containing 6 percent $Y_2O_3$ is shown in Table V and FIG. 8, which is a plot of stress at 1400° C. versus cross head travel in $10^{-3}$ inches, indicating deformation of the sample during loading. The Figure graphically illustrates for the data of Table V that strength at 1400° C. is dramatically reduced by the presence of $Al_2O_3$ in amounts up to 2.5 weight percent, where the intergranular phase has not been heat treated to promote crystallization.

TABLE V

Strength of Pressureless Sintered $Si_3N_4$ Bodies Containing 6 Percent $Y_2O_3$

| Sample No. | Density (%) Theoretical | $Al_2O_3$ (wt. Percent) | MOR (psi × 10³) | | | |
|---|---|---|---|---|---|---|
| | | | Room Temperature | 1000° C. | 1200° C. | 1400° C. |
| 1 | 98.0 | — | 83.8 | — | 68.8 | 57.1 |
| 2 | 98.2 | 0 | 69.4 | 62.2 | 64.4 | 61.3 |
| 3 | 100.0 | 1.5 | 100.6 | — | 65.5 | 29.5 |
| 4 | 100.0 | 2.5 | 104.7 | 88.6 | 56.7 | 23.4 |

A series of $Si_3N_4$+12 weight percent $Y_2O_3$ specimens containing about ½ to 2 weight percent $Al_2O_3$ were prepared and some were heat treated for 5 hours at 1525° C. to crystallize the 10-9-1 second phase after sintering. All specimens were tested to determine their strength. The recorder charts for as-sintered and for heat-treated specimens are given in FIGS. 3 and 4 where the applied load is horizontal and the cross-head travel time is vertical. The top two curves for as-sintered samples (FIG. 3) showed rounded displacement (cross-head travel) curves as the load is applied with 50 to 80 seconds required to apply sufficient load to fracture the specimens. This curvature is indicative of plastic deformation of the samples during loading. The average breaking strength of the two example specimens was 19,205 psi. For the two heat-treated samples, with the crystallized 10-9-1 second phase a different result was obtained as evidenced by the load-deformation curves in FIG. 4. First, there is essentially no curvature to the displacement trace indicating that plastic deformation has been minimized or eliminated. Only 20 to 22 seconds was needed to apply the breaking load, a further indication of the elimination of plastic deformation. Finally, the average breaking strength for the two specimens was 25,255 psi, an increase of 31.5% above that measured for the as-sintered specimens. This shows that a crystallized second phase formed by heat-treating will increase the elevated temperature of $Si_3N_4$—$SiO_2$—$Y_2O_3$ compositions relative to the same composition with amorphous second phases in the as-sintered condition.

Figure 5:
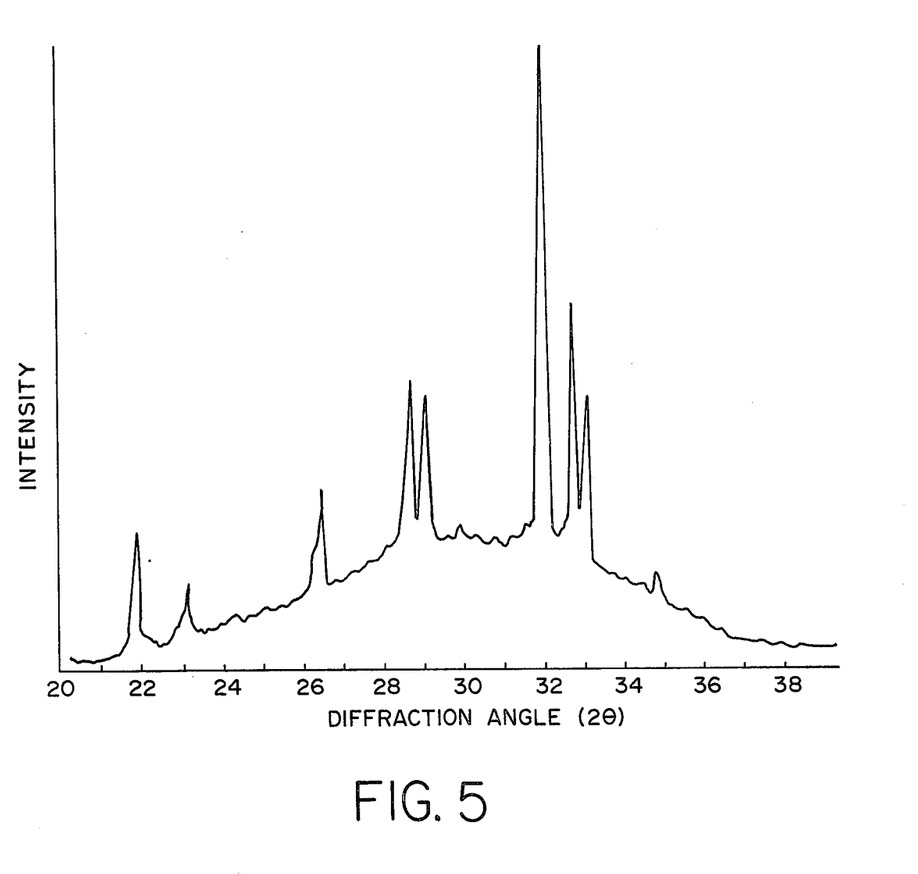
FIG. 5 is a portion of an x-ray diffraction pattern for a 52 percent $Y_2O_3$-28 percent $Al_2O_3$-20 percent $SiO_2$ composition.
Figure 6:
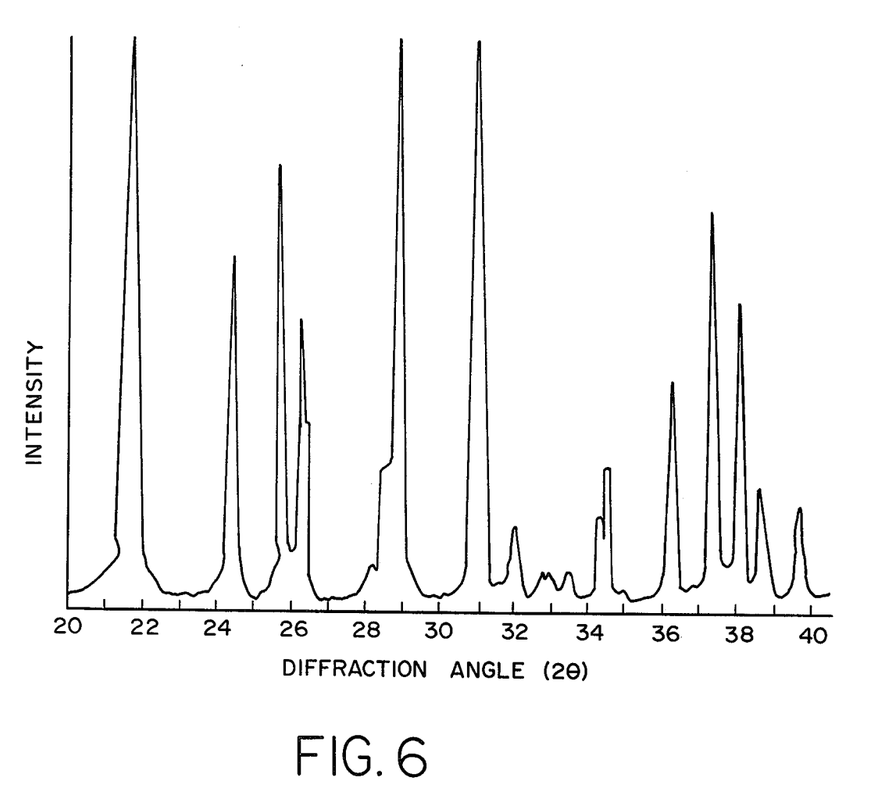
FIG. 6 is a portion of an x-ray diffraction pattern for a 65 percent $Y_2O_3$-35 percent $SiO_2$ composition.

In the above pressureless sintered samples, the second phase volume was small. In order to more distinctly observe the phase morphology of the intergranular material, two powder mixtures of 52 weight percent $Y_2O_3$-28 weight percent $Al_2O_3$-20 weight percent $SiO_2$; and 65 weight percent $Y_2O_3$-35 weight percent $SiO_2$, respectively were prepared. These are the second phase compositions of the $Si_3N_4$ body containing 6 weight percent $Y_2O_3$ with 2 weight percent $Al_2O_3$ and without $Al_2O_3$, respectively. The $SiO_2$ was added since it is a natural species on the surface of the starting $Si_3N_4$ powder at about 3 weight percent level. The mixtures were melted at 1750° and 1840° respectively and then quickly cooled to room temperature. As melted, the $Y_2O_3$—$Al_2O_3$—$SiO_2$ composition contained the phase $7Y_2O_3.9SiO_2$, a nonequilibrium phase according to R. R. Wills et al, *J. Materials Science*, Vol. 11, pp. 1305–1309, 1976, plus a large amount of amorphous material as evidenced by the broad hump in the x-ray diffraction scan of FIG. 5. The non-$Al_2O_3$ containing $Y_2O_3$—$SiO_2$ composition crystallized directly to the equilibrium phase $Y_2Si_2O_7$, according to Wills, et al, plus a minor amount of $Y_6Si_6O_{21}$, with no evidence of amorphous material. See the x-ray diffraction scan of FIG. 6. Thus, by direct experimentation with simulated intergranular compositions, it was demonstrated that the presence of a glass stabilizing oxide such as $Al_2O_3$ hinders the crystallization process during cooling which otherwise would proceed spontaneously to a high degree of completion.

Figure 7:
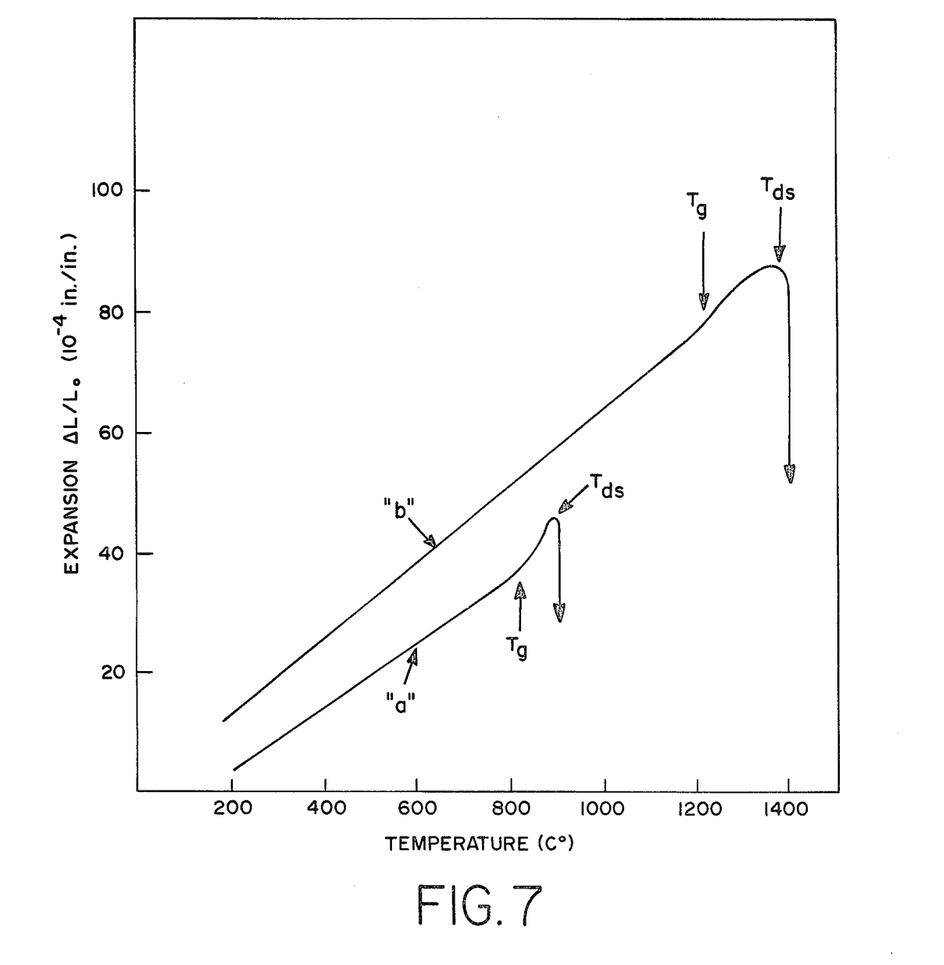
FIG. 7 is a dilatometric plot of curves "a" and "b" for the compositions of FIG. 5 before and after heat treatment.

In order to determine if the high temperature mechanical properties of the glassy intergranular phase contribute to the high temperature plastic deformation observed in $Al_2O_3$-containing $Si_3N_4$ bodies, dilatometer tests were carried out on the intergranular phase simulated compositions prepared above. The curves are shown in FIG. 7. Curve "a" indicates that the $Al_2O_3$-containing composition has a glass transition of about 800° C. and a dilatometric softening point of about 890° C. The transition temperature is that at which the thermal expansion changes from a relatively low value of a solid glass to the relatively high value of a liquid phase, while the softening point is the temperature at which the pressure of the dilatometer probe causes deformation of the sample. For comparison, curve "b" for the composition after a crystallization treatment at 1400° C. shows some evidence of a glass transition temperature at as high as 1200° C. and a softening point at about 1380° C. This indicates that the glass phase crystallized at about 1400° C.

Strength was measured for the $Y_2O_3$—$Al_2O_3$—$SiO_2$ body as melted and also after heat treatment at 1400° C. for 15 hours. The samples were cyclically loaded to 6000 psi at successively higher temperatures to determine the non-elastic yield point. The unheat treated sample was elastic to 800° C., and deformed at 900° C. In contrast, the heat treated sample was elastic up to 1300° C., and failed with no evidence of yielding at 1360° C., indicating an MOR of 19.2 Ksi. Thus, without heat treatment both the dilatometer and MOR tests indicated a substantial decrease in viscosity of the as-melted sample at about 900° C. X-ray diffraction analysis of the heat treated sample showed that heat treatment converted the non-equilibrium $7Y_2O_3.9SiO_2$ phase to $Y_2Si_2O_7$ and an unidentified crystalline phase with no evidence of amorphous material. Confirmation of $Y_2Si_2O_7$ as the major phase was accomplished metallographically.

While there has been shown and described what are at present considered the preferred embodiments of the invention, it will be obvious to those skilled in the art that various changes and modifications may be made therein without departing from the scope of the invention as defined by the appended claims.

What is claimed is:

1. A polycrystalline ceramic body consisting essentially of a first phase of $Si_3N_4$ grains, and a second substantially completely crystalline intergranular phase consisting essentially of $SiO_2$ and a densifying additive $RE_2O_3$ where RE is selected from the group consisting of Y and the lanthanide rare earths La, Ce, Pr, Nd, Pm, Sm, Eu, Gd, Tb, Dy, Ho, Er, Tm, Yb, and Lu.

2. The body of claim 1 wherein the intergranular phase additionally contains $Si_3N_4$.

3. The body of claim 2 wherein the intergranular phase additionally contains glass stabilizing impurities.

4. The body of claim 1 wherein RE is selected from the group consisting of Y and Ce.

5. The body of claim 1 wherein glass stabilizing impurities are maintained below about 0.5 weight percent.

* * * * *